United States Patent [19]

Kaffka et al.

[11] Patent Number: 4,605,306
[45] Date of Patent: Aug. 12, 1986

[54] GRATING MONOCHROMATOR

[75] Inventors: Károly Kaffka; Béla Nádai; András Czabaffy; Loránd Horváth, all of Budapest, Hungary

[73] Assignee: Kozponti Elelmiszeripari Kutato Intezet, Budapest, Hungary

[21] Appl. No.: 501,902

[22] Filed: Jun. 7, 1983

[30] Foreign Application Priority Data

Jun. 9, 1982 [HU] Hungary .............................. 1868/82

[51] Int. Cl.$^4$ .............................................. G01J 3/20
[52] U.S. Cl. .................................................... 356/334
[58] Field of Search ........................ 356/328, 332, 334

[56] References Cited

U.S. PATENT DOCUMENTS

| | | |
|---|---|---|
| 3,041,920 | 7/1962 | Landon . |
| 3,079,834 | 3/1963 | Martin . |
| 3,090,863 | 5/1963 | McPherson .................... 356/334 X |
| 3,211,049 | 10/1965 | McPherson .................... 356/334 X |
| 3,277,774 | 10/1966 | Landon et al. . |
| 3,414,356 | 12/1968 | Cary . |
| 3,609,046 | 9/1971 | Hamburger ........................ 356/222 |

FOREIGN PATENT DOCUMENTS

| | | |
|---|---|---|
| 1245681 | 10/1960 | France . |
| 2406816 | 5/1979 | France . |
| 135350 | 11/1978 | Japan ................................. 356/334 |
| 138224 | 10/1980 | Japan ................................. 356/334 |
| 1257208 | 12/1971 | United Kingdom . |

Primary Examiner—F. L. Evans
Attorney, Agent, or Firm—Young & Thompson

[57] ABSTRACT

The invention relates to a grating monochromator for providing monochromatic radiation the wavelength of which is linearly proportional to a translation or rotation, said monochromator comprising an optical device including a reflection grating (1), an entrance slit (4) transmitting a beam onto the optical device, an exit slit (5) transmitting the beam reflected by the optical device, and a mechanism for moving the optical device and at least one of the slits (4,5) with respect to each other. Within said monochromator the moving mechanism is constructed so that in the course of the moving both the entrance slit (4) and the exit slit (5) are always positioned along a Rowland-circle (R) related to the optical device including the grating (1), and there is a transducer (42) producing an output signal corresponding to the current wavelength value, said transducer (42) being connected to a member (33) translating or rotating proportionally to a distance between a point (A) of the Rowland-circle (R) lying diametrically opposite to the optical device and said at least one slits (4,5). The moving mechanism expediently comprises means (41,33) for altering the distance between said point (A) of the Rowland-circle (R) lying diametrically opposite to the optical device and said at least one slit (4,5), and said member (33) translating or rotating proportionally to said distance is a part of said means.

12 Claims, 4 Drawing Figures

GRATING MONOCHROMATOR

TECHNICAL FIELD

The subJect matter of the present invention is a grating monochromator for providing monochromatic radiation the wavelength of which is linearly proportional to a mechanical translation or rotation.

BACKGROUND ART

Monochromators have already been well known wherein the dispersion member was a reflection grating that forms the image of the incident beam of radiation passing through an entrance slit onto an exit slit. The wavelength of the emitting beam of radiation depends on the position of the entrance slit, the exit slit and the grating, and can be described by the following generalized grating-equation:

$$\sin\alpha + \sin\beta = \frac{K \cdot \lambda}{a} \quad (1)$$

where $\alpha$ is the angle included by the beam of radiation incident to the grating having passed through the entrance slit and the normal to the grating, $\beta$ is the angle included by the beam of wavelength $\lambda$ reflected by the grating toward the exit slit and the normal to the grating, $a$ is the spacing between the rulings of the grating, and $K$ is a positive integer referring to the order of the diffraction.

In the known spectrophotometers two of the three basic elements of the monochromator (entrance slit, grating, exit slit) are stationary and the third one is moved to change the wavelength. In the case, when one of the angles $\alpha$ and $\beta$ is constant and the other one is changed, or with a Littrow-arrangement of the entrance and exit slits, both angles are changed simultaneously so that $\alpha=\beta$, and a sinusoidal relation exists between the variable angle and the wavelength. To attain a linear scale—which is being especially desirable in the ultraviolet, the visible and the near infrared regions—the sinusoidal relation should be linearized.

In case of some known spectrophotometers a Scotch-yoke mechanism is utilized for the purpose of this linearization, wherein the sine of the rotational angle of the crankshaft is linearly proportional to the displacement of the yoke. In case of some other spectrophotometers a profiled disc is mounted on the shaft of the rotating member resulting in a translation or rotation linearly proportional to the sine of the angle of rotation. With these solutions of the linearization problem technological difficulties may arise in designing and reproducing the special profiles, furthermore the clearances and the distortions caused by uneven wear may result in errors.

Recently—especially in the low energy level ultraviolet and near infra-red regions—the application of the concave reflection gratings has become widely spread, that form the image of the entrance slit on the exit slit, and provide a high relative opening (diameter divided by the focal distance) as a result of the special ruling, performing also the function of the collimator. In these monochromators both the entrance and the exit slit might be positioned along the so-called Rowland-circle so that the image formation will be sufficiently sharp. As is well known, the diameter of the Rowland-circle is the distance between the center of curvature of the concave reflection grating and the center-point of the concave grating (the intersection of the optical axis and the grating, so-called vertex). So in this case linearizing the sinusoidal relationship for example by rotating the shaft of the concave grating by means of a Scotch-yoke mechanism is not yet sufficient, but the position and even the direction of one of the slits should also be varied in the course of the rotation. In case of the known concave reflection grating spectrophotometers the exit slit does not coincide with the Rowland-circle within a significant part of the spectral range. Consequently the spectral resolution is not satisfactory at these wavelengths on the one hand, and on the other hand a linear wavelength scale cannot be provided merely by linearizing the sinusoidal relationship.

DISCLOSURE OF THE INVENTION

The present invention provides a solution in which the sinusoidal relationship is linearized and at the same time the entrance slit and the exit slit are always disposed along the Rowland-circle in the course of the motion.

Therefore the invention relates to a grating monochromator for providing monochromatic radiation the wavelength of which is linearly proportional to a mechanical translation or rotation, said monochromator comprising an optical device including a reflection grating, an entrance slit transmitting beam onto the optical device, an exit slit transmitting a the beam reflected by the optical device, and mechanism for moving the optical device and at least one of the slits with respect to each other. The invention is characterized in that the moving mechanism is constructed so that in the course of the moving both the entrance slit and the exit slit are always positioned along a Rowland-circle related to the optical device including the grating, and there is a transducer producing an output signal corresponding to the current wavelength value, said transducer being connected to a member translating or rotating proportionally to a distance between a point on the Rowland-circle lying diametrically opposite to the optical device and said at least one slit.

In a preferred embodiment of the invention, the moving mechanism comprises means for altering the distance between said point on the Rowland-circle diametrically opposite to the optical device and said at least one slit and said member translating or rotating proportionally to said distance is a part of said means.

With the monochromator corresponding to the invention the sharp imaging of the entrance slit onto the exit slit assures a good spectral resolution, and a linear scale output of the current wavelength is always provided.

In an especially preferred embodiment of the monochromator of the invention the entrance slit and the exit slit are positioned in a Littrow-arrangement with respect to each other, and the optical device including the grating is moved with respect to the two stationary slits. Then, due to its simple construction a very advantageous arrangement can be attained, wherein the moving mechanism comprises a first member supported to move along an axis perpendicular to the optical axis of the slits, a first distance element pivotedly jointed to the first member, the optical device being positioned on said first distance element at a distance equal to the diameter of the Rowland-circle measured from the pivot joint, furthermore means to maintain a constant distance between the slits and a point on the first distance element, said point being halfway between the pivot joint and the center of the optical device. A great advantage of this embodiment is that the slits are fixed, and thereby the related optical and electronic units, as well as the sample to be tested can also be positioned stationary.

The means to maintain a constant distance can be accomplished with a second distance element pivotedly supported at the slits and pivotedly jointed to said first distance element at said point. In another arrangement the means to maintain a constant distance comprise a second member supported to move along an axis corresponding to the optical axis of the slits, and a point of the first distance element corresponding to the center of the optical device is pivotedly jointed to said second member. With these embodiments the moving mechanism may comprise a mechanism for altering the distance between the first member and the slits, which includes a motor for moving said first member by means of a threaded shaft, said threaded shaft being said member rotating proportionally to said distance.

In another possible embodiment of the monochromator corresponding to the invention the moving mechanism comprises a third distance element pivotedly supported at a point corresponding to the center of the Rowland-circle, said at least one slit being mounted on a holding member rotatably supported on the third distance element at a distance equal to the radius of the Rowland-circle measured from the pivoted support, and comprises means to keep the axis of said at least one slit directed to a point corresponding to the center of the optical device in the course of the moving. In this case the means to direct the axis of said at least one slit may preferably comprise a rod slidably fitted into a hole provided in the rotatably supported holding member, said rod being pivotedly supported at a point corresponding to the center point of the optical device. The moving mechanism may comprise a mechanism for altering the distance between the point on the Rowland-circle diametrically opposite to the optical device and said at least one slit mounted on said rotatably supported holding member, wherein said distance altering mechanism comprises a motor for moving said at least one slit with respect to the point on the Rowland-circle diametrically opposite to the optical device by means of a threaded shaft, said shaft being said member rotating proportionally to said distance. The Littrow-arrangement can also be used with this embodiment by fixing the relative position of the entrance and exit slits. There is another possible embodiment, wherein said at least one slit comprises only one slit of the entrance and exit slits, and the other slit is fixed at a point along the Rowland-circle with its optical axis directed to the point corresponding to the center point of the optical device.

In the monochromator according to the present invention the optical device including the reflection grating may be composed of only one concave reflection grating, or a plane reflection grating and a condenser placed before it. In the latter case the diameter of the Rowland-circle is equal to twice the focal distance of the condenser. One of the two surfaces of the condenser may also be shaped as a flat surface and ruled to provide a plane reflection grating.

BRIEF DESCRIPTION OF THE DRAWINGS

The invention will be described in the followings on the basis of preferred embodiments illustrated in the accompanying drawings wherein.

MODES FOR CARRYING OUT THE INVENTION

The members of the same or similar functions are denoted by the same reference number throughout the drawings.

Figure 1:
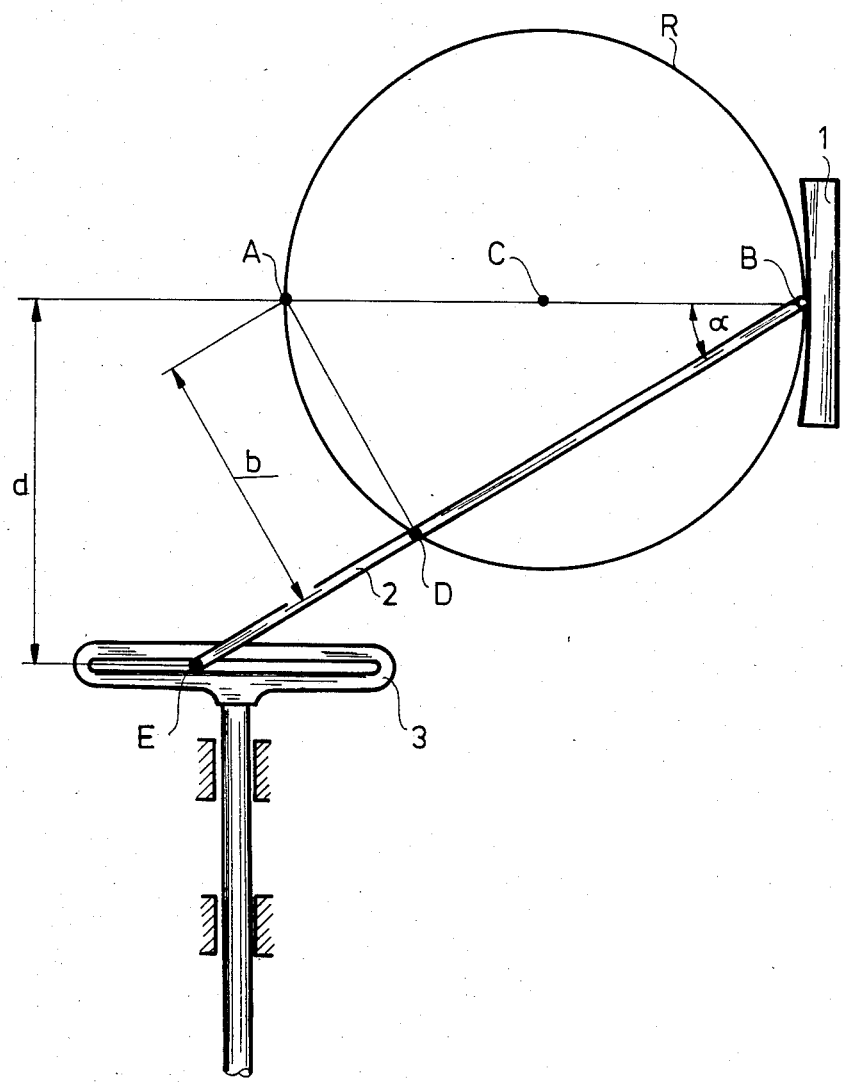
FIG. 1 is a schematic drawing illustrating the basic idea of the invention.

In FIG. 1 the optical center (vertex) of a fixed concave reflection grating 1 is denoted by point B, the center of the Rowland-circle R relating to the grating 1 lies at point C, and the point A lies on the Rowland-circle R diametrically opposite to point B. A rod 2 is pivoted at the point B. At the end point E of the rod 2 a pin is provided which is jointed to a yoke 3. As is well known, the distance d between point E and line $\overline{AB}$ is proportional to the sine of angle $\alpha$:

$$d = \overline{EB} \cdot \sin\alpha \qquad (2)$$

where $\overline{EB}$ is the distance between points E and B, and $\alpha$ is the angle of the triangle ABE at point B.

If the exit slit of the monochromator is fixed somewhere along the Rowland-circle R, e.g. at point A, and the entrance slit positioned at point D is mounted on rod 2 and oriented toward point B, then the displacement of the rod of the yoke 3 will be linearly proportional to the variation of the wavelength according to the grating-equation (1). However, while the rod 2 swings about point B, the point D will intersect the Rowland-circle R at only one point shown in FIG. 1. Considering the Rowland-circle R as a Thales-circle, ABD being a right triangle, the distance b between points A and D will also be proportional to the sine of angle $\alpha$:

$$b = \overline{AB} \cdot \sin\alpha \qquad (3)$$

where $\overline{AB}$ is the distance between points A and B.

So if it is made sure that point D always moves along the Rowland-circle R and the slit positioned at point D, e.g. the entrance slit, will be always directed at point B, then a sharp imaging will be attained at any wavelength between the entrance slit and the exit slit positioned somewhere along the Rowland-circle, in our example at point A, and the distance $b = \overline{AB} \cdot \sin\alpha$ will be linearly proportional to the wavelength. This can be realized e.g. by providing a member at point D, the distance of which measured from point C is kept constant by means of a link pivoted at points C and D, and the orientation of this member towards point B is maintained by a rod passing through a hole provided at said member and pivoted in point B. Thereby both the linearization and the moving of the entrance slit along the Rowland-circle R have been accomplished. The solution according to the present invention can be used even if the disperison element is not a concave reflection grating but a plane reflection grating with a condenser positioned in front of the plane grating. A Littrow-arrangement can also be realized by positioning both the entrance and the exit slits at point D.

Figure 2:
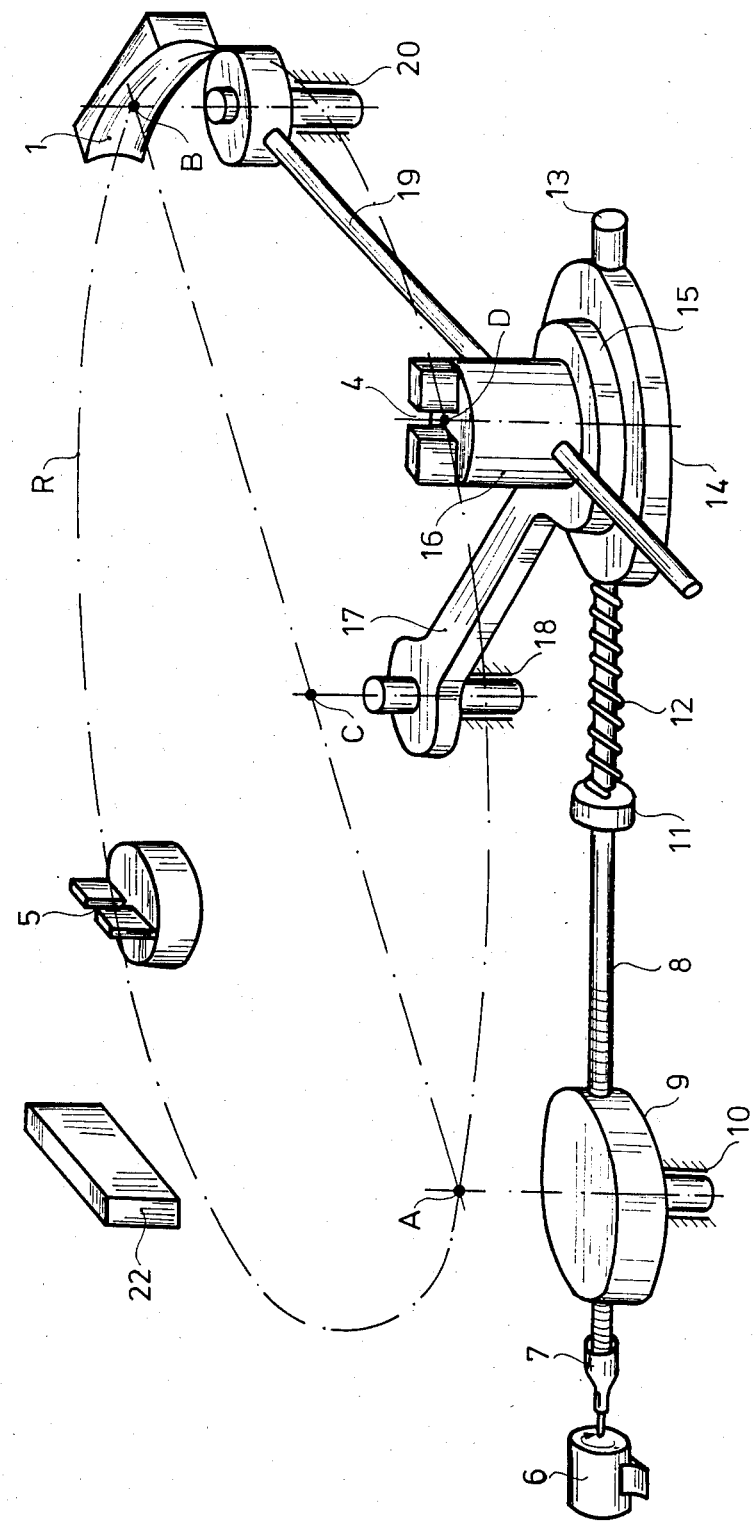
FIG. 2 is a schematic perspective view of an embodiment of the monochromator according to the invention.

In FIG. 2 the grating monochromator comprises a concave reflection grating 1, an exit slit 5 positioned stationary along the Rowland-circle R. The source of radiation, not shown in the drawing, is also supported by a holding member 16 holding, the entrance slit 4, the polychromatic beam of which being transmitted through the entrance slit 4 reflected by the grating 1 as a monochromatic beam onto the exit slit 5 and then passing through the exit slit 5 falls on the sample 22 to be tested. The holding member 16 is rotatably supported in the end piece 15 of a distance element 17 and its orientation is determined by a rod 19 slidably fitted in a hole provided in the holding member 16. The rod 19 is rotatably supported in a bearing 20 coaxial with point B corresponding to the center point (vertex) of the grating 1. The distance element 17 is rotatably supported in a bearing 18 coaxial with point C corresponding to the center of the Rowland-circle R. The end piece 15 and thereby the holding member 16 is driven by rotating a shaft 8 passing through a support member 14. A threaded portion of the shaft 8 is screwed into a threaded member 9 rotatably supported coaxially with point A diametrically opposite to point B of the Rowland-circle R, and is rotated by a fixed motor 6 via a flexible coupling 7. The shaft 8 is provided with a larger diameter end portion 13 to stop against the support member 14 under the pressure of a spring 12 supported by a collar 11 fixed on the shaft 8. The end piece 15 of the distance element 17 may be provided for example with two pins protruding upward and downward, respectively, and fitting in holes formed in the holding member 16 and the support member 14, said pins being short enough not to interfere with the holes provided for the rod 19 and the shaft 8, respectively.

In FIG. 2 it can be seen, that with respect to the stationary grating 1 and exit slit 5 the entrance slit 4 will always move along the Rowland-circle R while rotating the shaft 8 so that the entrance slit 4 is always directed to the center point B of the grating 1. The monochromator shown in FIG. 2 may also be realized with a Littrow-arrangement of the slits 4 and 5 so that both the entrance slit 4 and the exit slit 5 are supported by the holding member 16. In this case, however, the sample 22 should also be mounted on the holding member 16.

Figure 3:
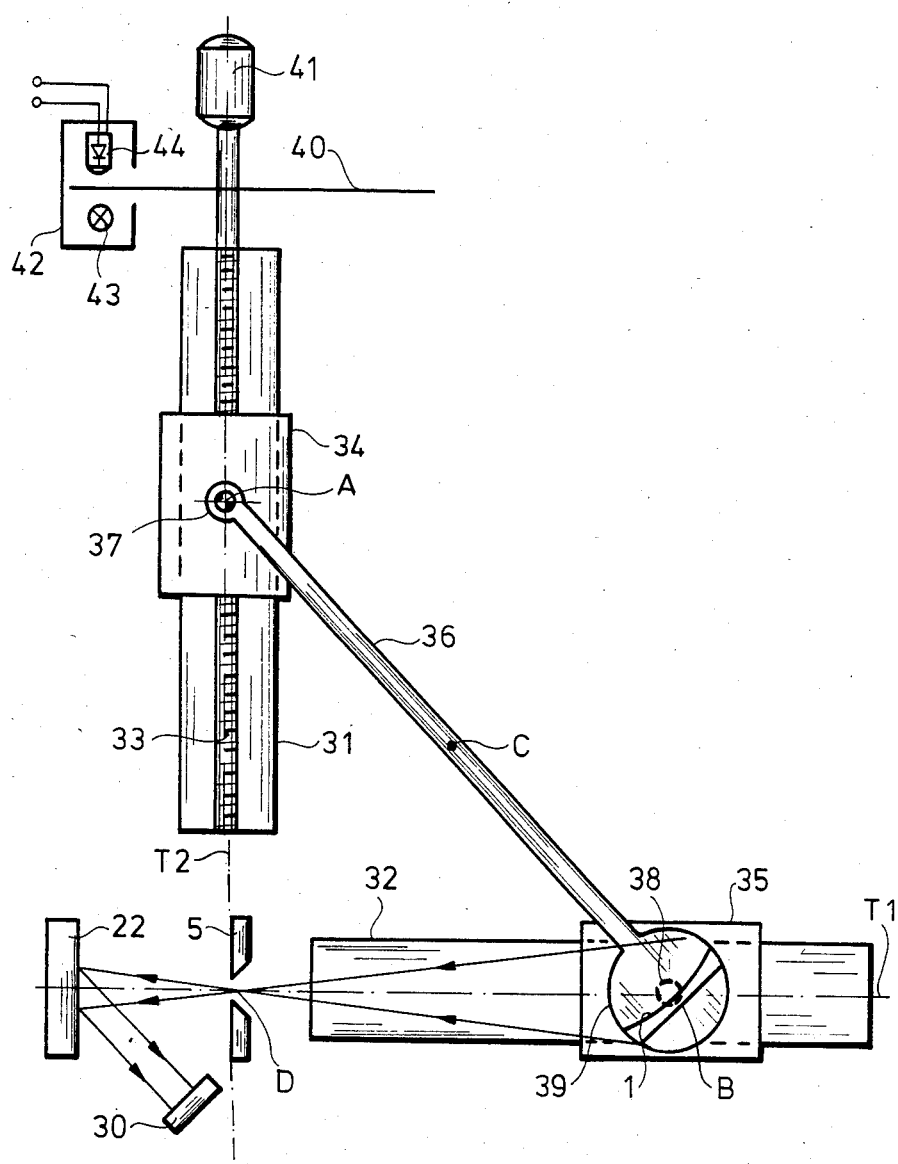
FIG. 3 is a schematic view of another embodiment of the monochromator according to the invention.

In the monochromator illustrated in FIG. 3 the exit slit 5 and the entrance slit—not shown—are positioned stationary one under the other, in a Littrow-arrangement. The polychromatic beam is transmitted through the entrance slit, positioned on the drawing above the plane of the paper, onto the concave reflection grating 1, the center point B of the grating 1 being in the plane of the paper, and a beam of a wavelength corresponding to the angular position of the grating 1 is reflected by the grating 1 onto the sample 22 via the exit slit 5 positioned below the plane of the paper. The radiation scattered by the sample 22 is detected by a sensor 30. In the embodiment shown two prismatic slide-ways 31 and 32 are also mounted in a fixed position with respect to the entrance slit and exit slit 5. The slide-way 32 serves to guide a member 35 along the axis T1 lying in a plane corresponding to the optical axis of the entrance slit and the exit slit 5 and free of any play, while the slide-way 31 is to guide a member 34 also free of any play along an axis T2 perpendicular to the axis T1 and lying in the plane of the slit 5. A holding member 39, supporting the concave reflection grating 1 and formed as one end of a distance element 36 is rotatably supported on a pivot 38 attached to the sliding member 35. The center point of the grating is coincident with axis T1. The other end of the distance element 36 is pivoted to the member 34 rotatably about a pivot 37. The pivots 37 and 38 are perpendicular to the plane of the slide-ways 31 and 32, and intersect the axes T2 and T1, respectively. The length of the distance element 36, i.e. the distance between the pivots 37 and 38 is equal to the diameter of the Rowland-circle of the concave reflection grating 1. The mechanism is moved with a threaded shaft 33 fitting in a threaded hole provided in the member 34 and driven by a fixed motor 41, while the member 35 freely slides on the slide-way 32. A disc 40 is mounted on the shaft 33 and provided with slots for an angular position transducer 42. The angular position transducer 42 provides an electric signal at the output of a photodiode 44 by interrupting the light from a source 43 when the disc 40 rotates.

It can be seen, that with the embodiment illustrated in FIG. 3 the point A corresponding to the pivot 37, the point B corresponding to the pivot 38, as well as the point D corresponding to the entrance slit (not shown) and the exit slit 5 are all positioned along a Thales-circle, this Thales-circle being at the same time the Rowland-circle R of the grating 1.

Figure 4:
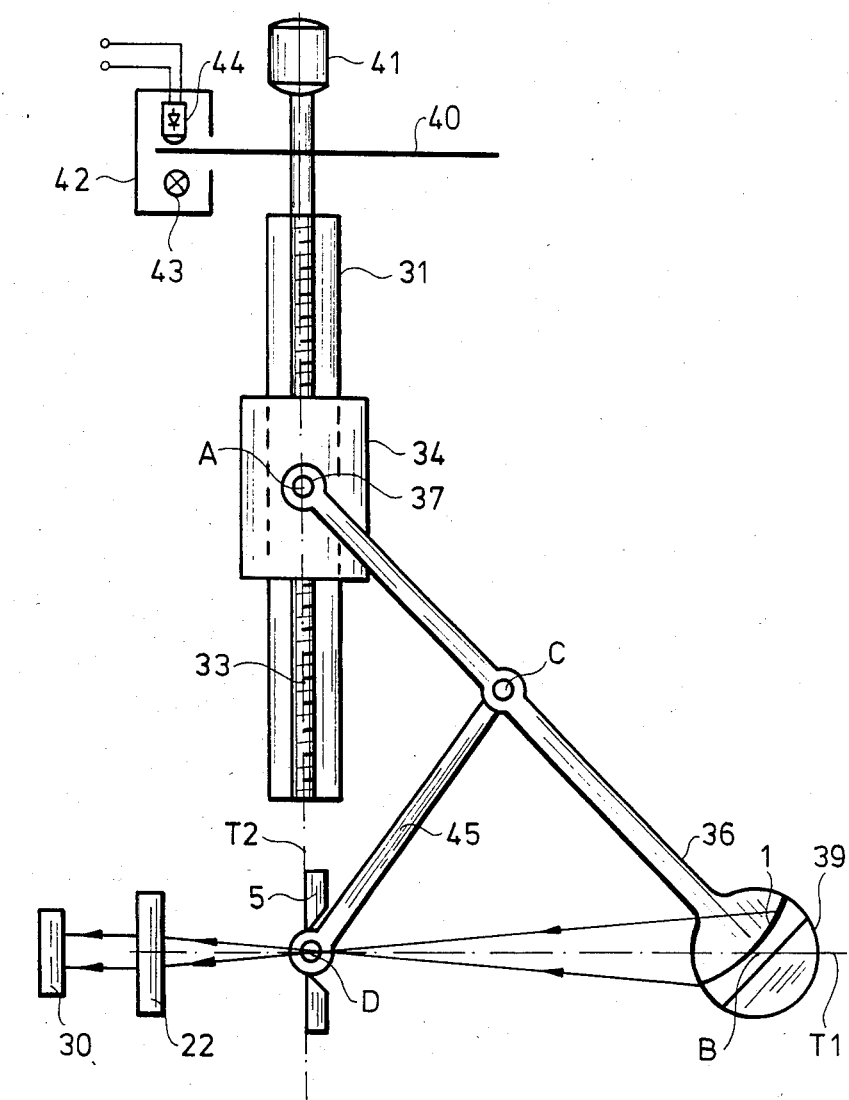
FIG. 4 is a schematic view of a further embodiment of the monochromator according to the invention.

The embodiment illustrated in FIG. 4 is similar to that shown in FIG. 3, in this case however the moving of the points A, B and D along a Thales-circle is accomplished—instead of by the slide-way 32 and the member 35 provided with the pivot 38—by means of a distance element 45, one end of which is pivotedly jointed to the point C of the distant element 36, this point C being the midpoint between points A and B and the center of the Thales-circle as well, while the other end of the distance element 45 is rotatably supported at a point corresponding to the point D. The length of the distance element 45, i.e. the distance between the pivot joints corresponding to the points C and D, is equal to the radius of the Rowland-circle. With the arrangement illustrated in FIG. 4 the beam of radiation passing through the exit slit 5 and then transmitted through the sample 22 reaches the sensor 30, so this is a transmission measuring arrangement.

With the embodiments illustrated in FIGS. 2, 3 and 4 the position of the entrance slit and the exit slit may be naturally interchanged, then the polychromatic source of radiation and the sample to be tested must also be correspondingly displaced.

The grating monochromator according to the invention can also be accomplished by positioning the radiating surface of one or more sources in place of the entrance slit, or the apparatus may be provided with an optical instrument to direct the radiation emitted by one or more sources, by means of mirrors for example, as if the incoming beam of radiation emerged from an entrance slit. Accordingly, throughout the description of the invention the expression "entrance slit" may also be understood as one or more sources of radiation positioned in place of the entrance slit or as an optical instrument described above.

We claim:
1. A grating monochromator comprising
a concave reflection grating defining a Rowland-circle;
an entance slit transmitting a radiation beam onto said grating;
an exit slit transmitting the radiation beam reflected by said grating;
a mechanism for moving said grating and at least one of said slits with respet to each other for setting different wavelengths of said reflected beam of radiation so that in the course of said moving both said entrance slit and said eit slit are always posi- tioned along the Rowland-circle of said grating; and means for driving said moving mechanism by altering the distance between said at least one slit and a point on the Rowland-circle lying diametrically opposite to said grating; said driving means having a member moving proportionally to aid distance thereby providing a linear correspondence between said moving and said wavelength setting.

2. The monochromator according to claim 1, wherein said entrance slit and exit slit are fixed in Littrow-arrangement, and said moving mechanism comprises a first member supported to move along an axis perpendicular to the optical axis of the slits, a first distance element pivotally jointed to said first member, said grating being fixed on said first distance element so that its center is at a distance equal to the diameter of the Rowland-circle from said pivot joint and its optical axis passes through said pivot joint, and means to maintain a constant distance between said slits and a first point on said first distance element, said first point being halfway between said pivot joint and the center of said grating.

3. The monochromator according to claim 2, wherein said means to maintain a constant distance include a second distance element pivotally supported at said slits and pivotally jointed to said first distance element at said first point.

4. The monochromator according to claim 2, wherein said means to maintain a constant distance include a second member supported to move along an axis corresponding to the optical axis of the slits, and a second point of said first distance element corresponding to the center of said grating being pivotally jointed to said second member.

5. The monochromator according to claim 2, wherein said driving means comprise a threaded shaft passing through a threaded hole provided in said first member for altering the distance of said first member from said slits, and a motor for rotating said threaded shaft, said threaded shaft being said member moving proportionally to said distance.

6. The monochromator according to claim 5, wherein a transducer is connected to said threaded shaft for producing pulses the number of which is proportional to the angle of rotation of said threaded shaft.

7. The monochromator according to claim 1, wherein said grating is fixed, and said moving mechanism comprises a distance element pivotally supported at a point corresponding to the center of the Rowland-circle, said at least one slit being mounted on a holding member rotatably supported on said distance element at a distance equal to the radius of the Rowland-circle from said pivoted support, and comprises means to orient the optical axis of said at least one slit in the course of the moving towards the center of said grating.

8. the monochromator according to claim 7, wherein said means to orient the optical axis of said at least one slit is a rod slidably disposed in a hole in said holding member said rod being pivotally supported at a point corresponding to the center of said grating.

9. The monochromator according to claim 7, wherein said driving means comprise a member rotatably supported at a point on the Rowland-circle lying diametrically opposite to said grating, said member being provided with a threaded hole, a shaft for altering the distance of said holding member from said rotatably supported member, and a motor for rotating said shaft, aid shaft having a threaded portion passing through said threaded hole of said member, and said shaft being said member moving proportinally to said distance.

10. The monochromator according to claim 7, wherein said at lest one slit comprises said entrance slit and said exit slit mounted in Littrow-arrangement on said holding member.

11. The monochromator according to claim 7, wherein said at least one slit comprises only one slit of said entrance and exit slits mounted on said holding member, the other slit being fixed at a point along the Rowland-circle with its optical axis oriented toward the center of said grating.

12. The monochromator according to claim 11, wherein said one slit is the entrance slit and said other slit is the exit slit.

* * * * *